UNITED STATES PATENT OFFICE.

LEOPOLD SPIEGEL, OF BERLIN, GERMANY, ASSIGNOR TO CHEMISCHE FABRIK GUESTROW, OF GUESTROW, GERMANY, A FIRM.

SALT OF YOHIMBINE.

SPECIFICATION forming part of Letters Patent No. 716,776, dated December 23, 1902.

Application filed February 2, 1901. Serial No. 45,724. (No specimens.)

*To all whom it may concern:*

Be it known that I, LEOPOLD SPIEGEL, a subject of the Emperor of Germany, residing at Berlin, Germany, have invented a certain new and useful Process of Producing Salts of Yohimbine, of which the following is a specification.

This invention relates to the production of the salts of yohimbine, a new alkaloid, the characteristics and origin of which have been described and the process of manufacturing which has been claimed in my application for Letters Patent, Serial No. 23,021, filed July 9, 1900.

The salts of yohimbine are used in medicine as stimulants, acting on the nerve-centers and the heart. The normal dose of the chlorhydrate is 0.005 gram or ten drops of a one-per-cent. solution. This may be given three times daily or 0.015 gram per diem. The maximal dose should not exceed 0.0225 gram per diem, as larger doses act poisonous. The salts of yohimbine may be taken in aqueous solution or in carefully-dosed tablets, or the solution may be injected subcutaneously.

The salts of yohimbine are prepared by suspending the alkaloid in water and adding an equivalent quantity of the acid. The alkaloid may also be previously dissolved in a solvent which will mix with water, such as alcohol, or one salt may be used to obtain another by double decomposition. Thus the chlorid of yohimbine may be prepared from its sulfate by the action of barium chlorid. As all these salts of yohimbine are more or less soluble in water, they are obtained pure by repeated recrystallizations from hot water. In the formation of these salts the acid is added, but at the same time there evades one molecule of water, so that, in fact, the acid radical is substituted for hydroxyl (HO) under formation of water:

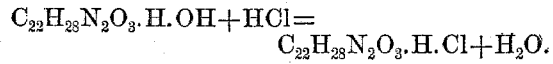

$$C_{22}H_{28}N_2O_3.H.OH + HCl = C_{22}H_{28}N_2O_3.H.Cl + H_2O.$$

Thus all salts of yohimbine correspond to the general formula, $(C_{22}H_{28}N_2O_3)_n H_n.R$, in which n expresses the molecular value of the acid radical R.

Among others the following salts of yohimbine have been prepared: yohimbine chlorid, 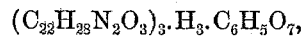 $C_{22}H_{28}N_2O_3.HCl$, minute white needles, melting at 300° centigrade; yohimbine nitrate, $C_{22}H_{28}N_2O_3.HNO_3$, colorless ribbed prisms, decomposed at 292° centigrade without melting; yohimbine phosphate, $(C_{22}H_{28}N_2O_3)_3.H_3.PO_4$, fine concentrically-grouped needles, melting at 263° centigrade; yohimbine citrate, $$(C_{22}H_{28}N_2O_3)_3.H_3.C_6H_5O_7,$$

small white indistinctly-formed crystals, melting at 238° centigrade.

Having thus described my invention, what I claim as new, and desire to secure by Letters Patent, is—

1. As a new article of manufacture a salt of yohimbine, soluble in water and possessing the medical properties of the alkaloid, corresponding to the general formula

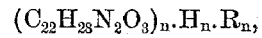

$$(C_{22}H_{28}N_2O_3)_n.H_n.R_n,$$

substantially as set forth and described.

2. A chemical salt composed of a yohimbine chlorid consisting of minute white needles melting at about 300° centigrade and corresponding nearly to the formula

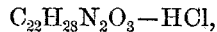

$$C_{22}H_{28}N_2O_3 - HCl,$$

substantially as described.

In testimony whereof I affix my signature in presence of two witnesses.

LEOPOLD SPIEGEL.

Witnesses:
 HENRY HASPER,
 WOLDEMAR HAUPT.